United States Patent
Knutsson et al.

(10) Patent No.: US 10,602,034 B2
(45) Date of Patent: Mar. 24, 2020

(54) CAMERA MODULE FOR A MOTOR VEHICLE AND METHOD OF MOUNTING A CAMERA MODULE

(71) Applicant: Autoliv Development AB, Vågårda (SE)

(72) Inventors: Per Knutsson, Linköping (SE); Peter Fredriksson, Linköping (SE)

(73) Assignee: VEONEER SWEDEN AB, Vargarda (SE)

( * ) Notice: Subject to any disclaimer, the term of this patent is extended or adjusted under 35 U.S.C. 154(b) by 628 days.

(21) Appl. No.: 14/704,512

(22) Filed: May 5, 2015

(65) Prior Publication Data

US 2015/0326756 A1    Nov. 12, 2015

(30) Foreign Application Priority Data

May 7, 2014   (EP) .................................... 14167377

(51) Int. Cl.
*H04N 5/225* (2006.01)
*H04N 13/00* (2018.01)
*H04N 13/286* (2018.01)

(52) U.S. Cl.
CPC ......... *H04N 5/2251* (2013.01); *H04N 5/2253* (2013.01); *H04N 5/2254* (2013.01); *H04N 5/2257* (2013.01); *H04N 13/286* (2018.05)

(58) Field of Classification Search
None
See application file for complete search history.

(56) References Cited

U.S. PATENT DOCUMENTS

| | | | | |
|---|---|---|---|---|
| 8,605,211 B2* | 12/2013 | Webster | ............... | H04N 5/2257 348/342 |
| 2004/0056971 A1* | 3/2004 | Yang | .................... | H04N 5/2253 348/294 |
| 2005/0179805 A1* | 8/2005 | Avron | .................... | G02B 7/022 348/340 |
| 2008/0024833 A1 | 1/2008 | Iwasaki | | |
| 2008/0024883 A1* | 1/2008 | Iwasaki | .................. | G02B 7/022 359/808 |
| 2009/0244361 A1 | 10/2009 | Gebauer et al. | | |
| 2010/0123007 A1* | 5/2010 | Wittenberg | ............... | G02B 3/14 235/454 |
| 2013/0076925 A1* | 3/2013 | Tsai | ..................... | H04N 5/2253 348/208.99 |
| 2014/0063265 A1* | 3/2014 | Shukla | ................... | G03B 13/18 348/187 |
| 2017/0280034 A1* | 9/2017 | Hess | ..................... | H04N 5/2257 |

FOREIGN PATENT DOCUMENTS

| | | |
|---|---|---|
| DE | 102010047106 A1 | 4/2012 |
| JP | 2006208928 A | 8/2006 |
| WO | WO2011131164 A1 | 10/2011 |

OTHER PUBLICATIONS

European Extended Search Report dated Oct. 23, 2014.

* cited by examiner

*Primary Examiner* — Edemio Navas, Jr.
(74) *Attorney, Agent, or Firm* — Dickison Wright PLLC

(57) ABSTRACT

A camera module for a motor vehicle includes a lens objective, a lens holder holding said lens objective, and a back plate connected to said lens holder and holding an image sensor in or close to an image plane of the lens objective. The alignment of the lens holder relative to the back plate is fixed by a glue joint between the lens holder and the back plate.

9 Claims, 5 Drawing Sheets

Fig. 5
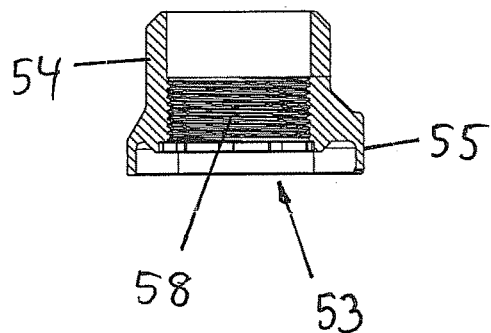
Fig. 6
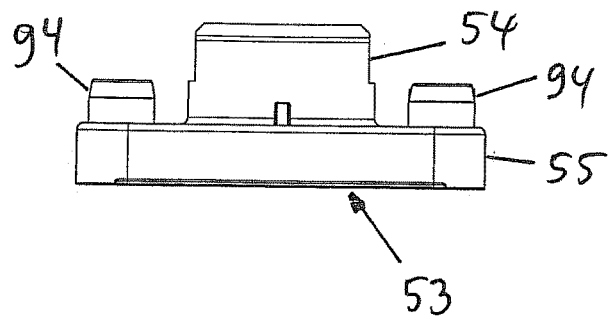
Fig. 7
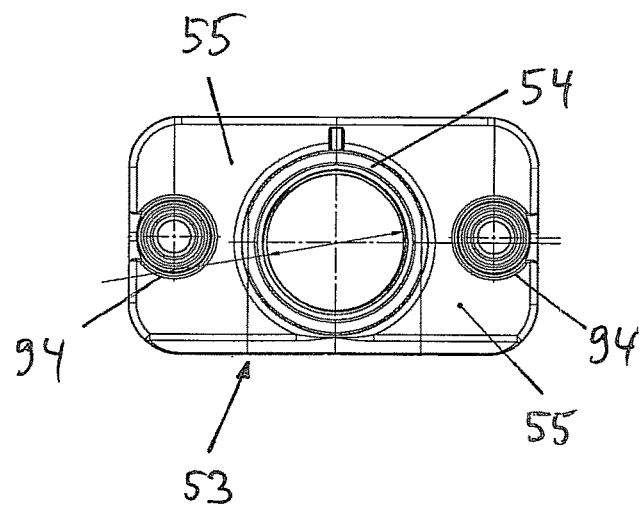
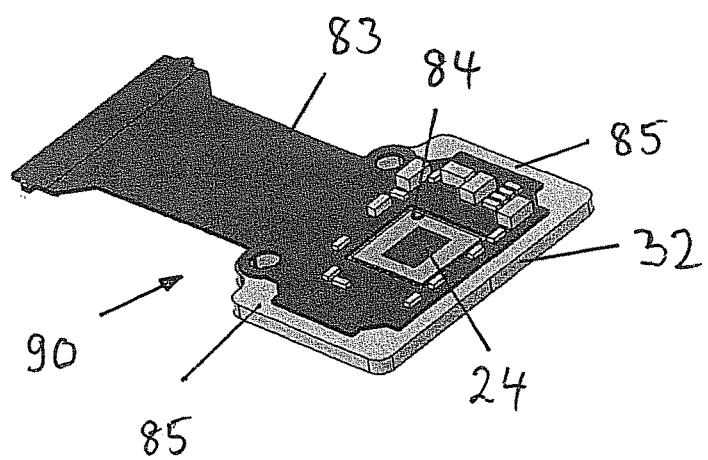
Fig. 8

CAMERA MODULE FOR A MOTOR VEHICLE AND METHOD OF MOUNTING A CAMERA MODULE

CROSS REFERENCE TO RELATED APPLICATIONS

This application claims priority to European Patent Application 14167377.2.

BACKGROUND

1. Field of the Invention

The present invention generally relates to a camera module for a motor vehicle, comprising a lens objective, a lens holder holding said lens objective, and a back plate connected to said lens holder and holding an image sensor in or close to an image plane of the lens objective. The invention also relates to a method of mounting a camera module for a motor vehicle.

2. Description of Related Art

In the assembly process of camera modules, the lens objective is usually aligned relative to the image sensor in order to compensate for manufacturing tolerances of the lens objective and tilt or misalignment of the image sensor, which would otherwise lead to a deterioration of the image quality. The aim of the alignment is to have the sensitive surface of the image sensor positioned in the image plane of the lens objective and to have the image centered on the image sensor. The alignment procedure usually involves adjusting five degrees of freedom, in particular bore sight correction (xy), tip-tilt or yaw-pitch adjustment ($\Theta_x, \Theta_y$) and focus adjustment (z), or six degrees of freedom, with additional roll adjustment ($\Theta_z$), in particular for stereo configurations involving a plurality of co-operating camera modules.

A preferred alignment process called active alignment uses image data acquired by the image sensor of the camera during assembly as feedback for adaptively determining the optimum position of the lens objective relative to the image sensor. The lens objective is freely moved relative to the image sensor while simultaneously capturing images and thus determining the orientation of the lens objective that yields the best image quality. Once the optimal position and orientation of the lens objective has been determined, it is conventionally fixed relative to the image sensor by a glue joint between the lens objective and the front of the lens holder.

Although the optical axis approximately remains centered on the image sensor and bore sight errors are suppressed, a disadvantage of this concept is that changes of the glue due to temperature changes can result in significant shifts of the image plane. In the case of stereo systems this will lead to a violation of the stereo stability. Furthermore, since the lens objective is usually rotationally symmetrical around the optical axis, a roll angle displacement of the image sensor cannot be corrected by rotating the lens objective relative to the image sensor in the alignment process. Therefore, in a stereo system the roll alignment is performed by rotating one camera module around its optical axis during mounting of the camera modules into an external camera housing part, which is very laborious.

Also, in a stereo camera system it is required that the two cameras eyes have a coincident bore sight, with minimal change over temperature. The active alignment equipment would have to be modified significantly in order to handle both mono and stereo camera systems. It is desired to share common production processes as much as possible in order to gain efficiency and throughput, hence a modular approach for the camera eyes. It is also critical to maintain focus over the temperature envelope for any automotive camera.

DE 10 2010 047 106 A1 and WO 2011/131164 A1 respectively disclose a camera system where the lens objective is fixed relative to the image sensor by a glue joint between the lens objective and the lens holder. Here as well as displacement of the image sensor in the roll angle cannot be corrected by rotating the lens holder relative to the image sensor in the alignment process.

SUMMARY

The problem underlying the present invention is to provide a camera module which is suited to be used both in mono and stereo systems without modification, which allows a roll alignment already during mounting of the camera module and which improves stereo stability in the case of a stereo system.

The invention solves this object with the features of the independent claims. According to the invention, the alignment of the lens holder relative to the back plate is fixed by a glue joint between the lens holder and the back plate. This allows placing the glue joint advantageously in or close to the sensitive plane of the image sensor, or in or close to the image plane of the lens objective. This positioning of the glue joint has the large advantage that changes of the glue due to temperature changes do not result in significant shifts of the image plane. Therefore, generally, the stability of the camera module and the image quality is less prone to temperature changes. The image plane is preferably the location in which the lens objective creates a focused image.

In the case of stereo systems the stereo stability is well preserved over temperature. Furthermore, a roll angle displacement of the image sensor can be corrected by rotating, in the alignment process, the lens holder relative to the back plate holding the image sensor. In other words, the roll alignment can be performed already in the mounting of the camera module, such that the mounted camera module can be fully roll-aligned in itself, and no further roll alignment is required during the mounting of the camera modules into a camera housing. One and the same type of camera module is suited to be used without modifications in mono as well as in stereo applications.

In order to minimize the bore sight error, the center of the back plate advantageously has a generally non-zero off-set in the image plane relative to the optical axis depending on the tip/tilt correction during the mounting of the camera module.

Preferably a lens barrel and/or lens spacers of the lens objective are made of metal, preferably of brass. Metal, in particular brass, as base material for the lens objective has preferred temperature-change sensitivity properties. This allows improving the insensitivity of the camera unit to temperature changes.

A preferred aspect of the invention relates to an active alignment procedure which is advantageously performed by the vision system manufacturer. The active alignment procedure advantageously comprises the steps of providing a mounted lens holder unit, applying glue to the lens holder unit and/or to the back plate, positioning the lens holder unit and the back plate relative to each other, taking reference images, changing the position and/or orientation of the lens holder unit relative to the back plate until the relative position and/or orientation becomes optimal, and hardening the glue while holding the lens holder unit and the back plate in the optimal relative position and orientation.

During this active alignment, the yaw and pitch, or tip and tilt, of the lens objective is advantageously adjusted such that the image plane of the lens objective coincides with the image sensor. This implies that the lens objective is rotated around the two tip-tilt rotational degrees of freedom. The magnitude of these rotations is recorded by an alignment device. Furthermore, the x-y-position of the image in the sensitive plane of the image sensor is adjusted by moving the lens holder unit with the lens objective in x and y direction, such that the camera module will be looking straight once mounted into an external housing and the bore sight error is minimized. Due to the active alignment in the x and y directions the bore sight of each camera module is inherently well-defined, such that no additional bore sight adjustment between two camera modules is required for stereo systems.

Furthermore, during the above active alignment the rotational or roll error of an object as seen by the image sensor is advantageously recorded by an alignment device. This recording is translated into a rotation of the lens holder itself, such that the image sensor is aligned to external features of the lens holder. These external features of the lens holder may be used to mate the camera module into an external camera housing part.

As a result of the active alignment, there will be a generally wedge-shaped glue joint. Since the glue joint is advantageously provided at the image sensor plane, or alternatively at the principal plane of the lens objective, the bore sight is essentially maintained independent of the individual wedge angle.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIG. 5 shows a cross-sectional view of a lens holder;
FIG. 6 shows a side view of a lens holder;
FIG. 7 shows a top view onto a lens holder;
FIG. 8 shows a perspective view of a back plate assembly.

DETAILED DESCRIPTION

Figure 1:
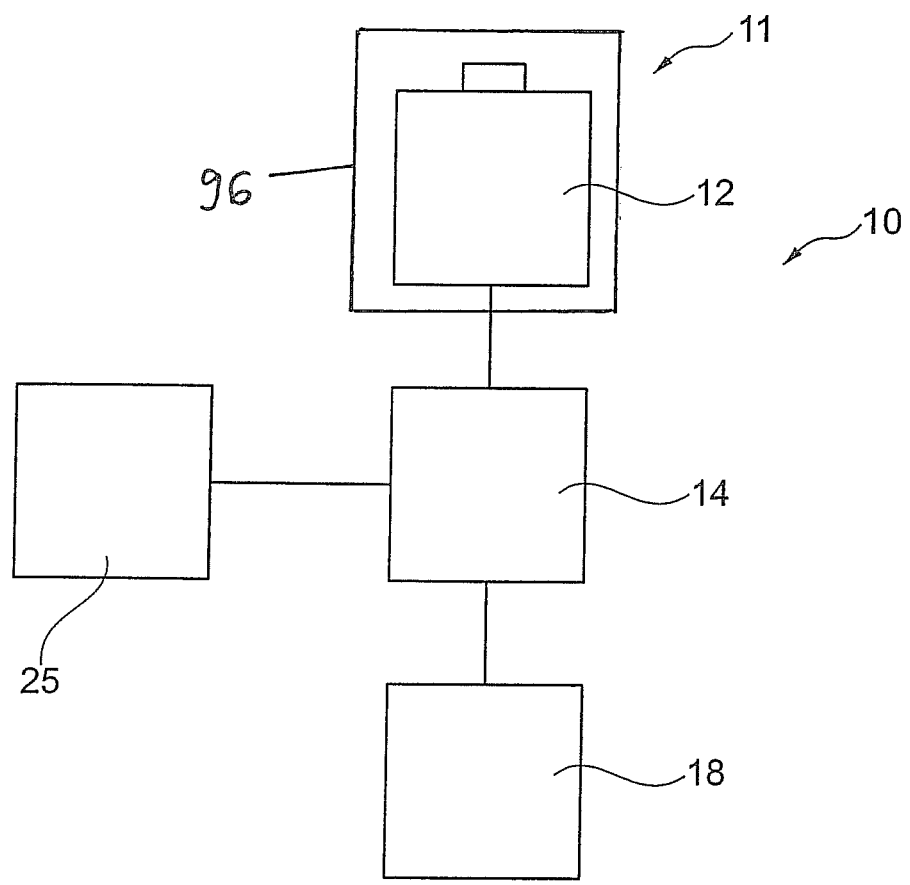
FIG. 1 shows a scheme illustrating a vision system.

Referring now to FIG. 1, the vision system 10 is mounted in a motor vehicle and comprises an imaging means 11 for acquiring images of a region surrounding the motor vehicle, for example a region in front of the motor vehicle. Preferably the imaging means 11 comprises one or more optical imaging devices 12, in particular camera modules, in particular operating in the visible wavelength range. However, infrared cameras may also be possible, where infrared covers near IR with wavelengths below 5 microns and/or far IR with wavelengths beyond 5 microns. In some embodiments the imaging means 11 comprises a plurality imaging devices 12 in particular forming a stereo imaging means 11. In other embodiments only one imaging device 12 forming a mono imaging means 11 can be used. Each camera module 12 has one optical path; therefore it can also be called a camera eye.

The imaging means 11 may be coupled to an image pre-processor not shown in FIG. 1 adapted to control the capture of images by the imaging means 11, receive the electrical signal containing the image information from the imaging means 11, warp pairs of left/right images into alignment and/or create disparity images, which per se is known in the art. The image pre-processor may be realized by a dedicated hardware circuit, in particular a Field Programmable Gate Array (FPGA). Alternatively the pre-processor, or part of its functions, can be realized in the electronic processing means 14. In case of a mono imaging means 11 using only one camera 12 a pre-processor is not needed.

The image data are provided to an electronic processing means 14 where further image and data processing is carried out by corresponding software. In particular, the image and data processing in the processing means 14 comprises the following functions: identification and classification of possible objects surrounding the motor vehicle, such as pedestrians, other vehicles, bicyclists or large animals; tracking over time the position of identified object candidates in the recorded images; estimation of a collision probability between the vehicle and a detected object; and/or activation or control of at least one driver assistance means 18 depending on the result of said collision probability estimation. The driver assistance means 18 may in particular comprise a display means for displaying information relating to a detected object. However, the invention is not limited to a display means. The driver assistance means 18 may in addition or alternatively comprise a warning means adapted to provide a collision warning to the driver by suitable optical, acoustical and/or haptical warning signals; one or more restraint systems such as occupant airbags or safety belt tensioners, pedestrian airbags, hood lifters and the like; and/or dynamic vehicle control systems such as brakes or steering means. The processing means 14 expediently has access to a memory means 25.

The electronic processing means 14 is preferably programmed or programmable and expediently comprises a microprocessor or micro-controller. The electronic processing means 14 can preferably be realized in a digital signal processor (DSP). The electronic processing means 14 and the memory means 25 are preferably realised in an on-board electronic control unit (ECU) and may be connected to the imaging means 11 via a separate cable or a vehicle data bus. In other embodiments the ECU and one or more of the imaging devices 12 can be integrated into a single unit, where a one box solution including the ECU and all imaging devices 12 can be preferred. All steps from imaging, image processing to activation or control of driver assistance means 18 are performed automatically and continuously during driving in real time.

In a preferred embodiment shown in FIGS. 2 to 8 the camera module 12 comprises a lens objective 20, a lens holder 53 holding the lens objective 20, an image sensor 24 and a back plate 32 holding the image sensor 24. The lens holder 53 is connected to the back plate 32 by means of a glue joint 80 which may be overall ring-shaped, or for example be composed of a plurality of glue dots. The glue 80 preferably is UV curable glue. The lens holder 53, the back plate 32 and the glue joint 80 form a housing 22 which, together with the lens objective 20, is basically closed in a light tight manner except for an incident light opening 28. With respect to thermal stability, the lens holder 53 is preferably made of metal, for example Zinc alloy. The mounted back plate unit 90 as shown in FIG. 8 comprises the back plate 32, the sensor 24 and the printed circuit board 83.

The lens holder 53 comprises a tubular part 54 which is preferably cylindrical and extends parallel to the optical axis of the lens objective 20, and a base part 55 to connect the lens holder 53 to the back plate 32 by the glue joint 80. The tubular part 54 of the lens holder 53 and the lens objective 20 are arranged concentrically to the optical axis of the lens objective 20. The lens holder 53 preferably comprises external features 94 or position defining means, which may be provided on the upper side of the base part 55 of the lens holder 53, through which the camera module 12 can be fastened with fixed orientation to an external camera housing part 96 of the imaging means 11.

Figure 2:
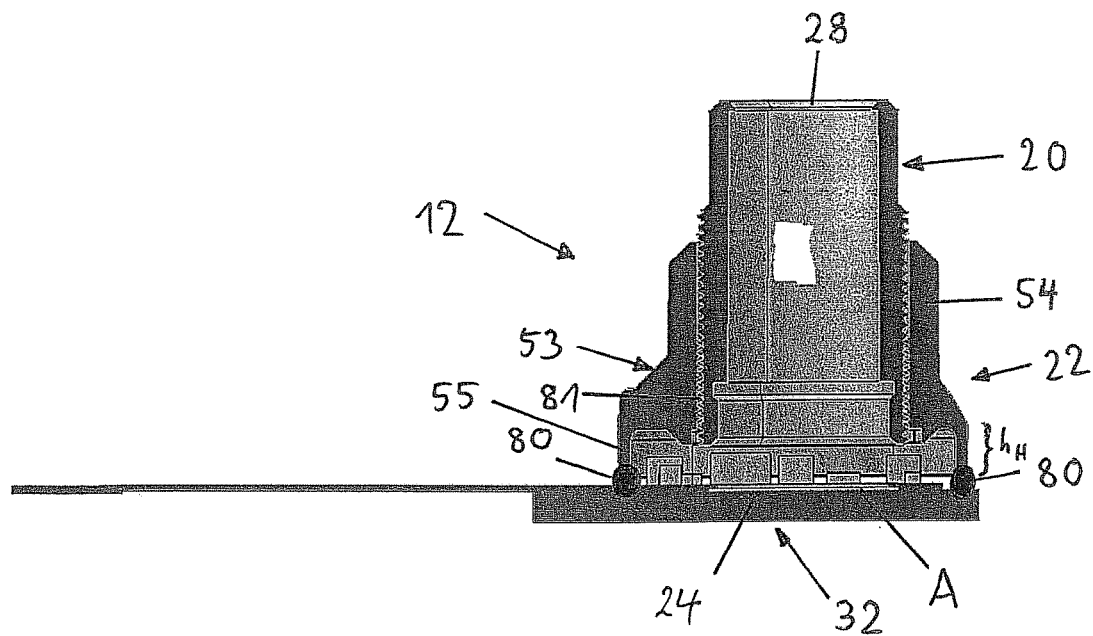
FIG. 2 shows a cross-sectional view of a camera module.
Figure 3:
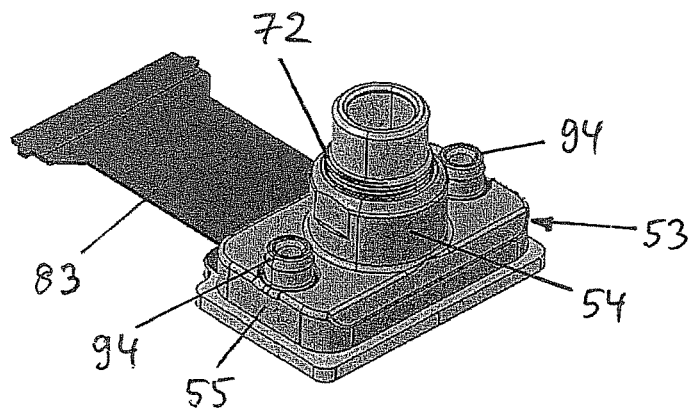
FIG. 3 shows a perspective view of a camera module.
Figure 4:
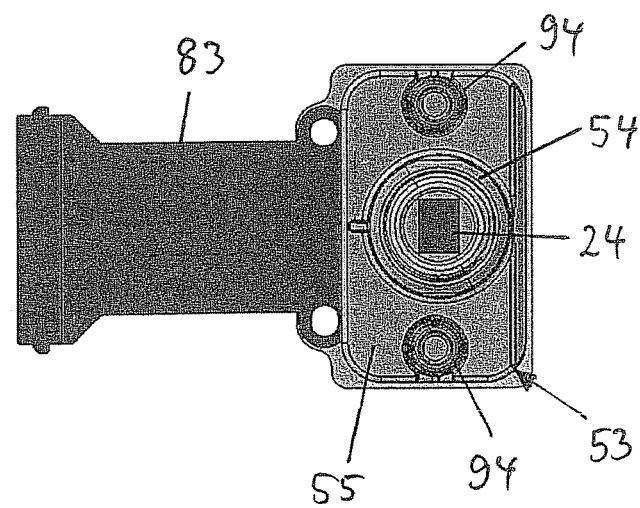
FIG. 4 shows a top view onto a camera module.

The lens objective 20 is coaxially held in the tubular part 54 of the lens holder 53 and connected to it via a screw connection. More specifically, the lens holder 53 comprises an inner thread 58 and the lens objective 20 comprises a corresponding outer thread 72 adapted to engage the thread 58 of the lens holder 53. The lens objective 20 can therefore be screwed into the lens holder 53. The connection between the lens objective 20 and the lens holder 54 is fixed by glue 81 preferably applied between the threads 58, 72. The attachment between the lens objective 20 and the lens holder 53, realized by thread 58, 72 engagement, advantageously is placed in or near the principal plane of the lens objective 20. This implies a robust solution with regards to bore sight stability over temperature. As shown in FIG. 2, the lens objective 20 preferably projects beyond the top end of the lens holder 53 which ensures a compact design of the camera module 12.

Incident light from an object surrounding the motor vehicle falls through the opening 28 and is focussed by the lens objective 20 in the image plane A of the lens objective 20. The sensitive plane of the image sensor 24 is advantageously disposed at or in the image plane of the lens objective 20. The image sensor 24 is preferably a two-dimensional image sensor, in particular an optical sensor having maximum sensitivity in the visible wavelength region, and is adapted to convert incident light into an electrical signal containing image information of the object to be detected. The image sensor 24 may for example be a CCD sensor or a CMOS sensor.

The rigid back plate 32 is preferably made of metal, in particular steel. This is advantageous over the conventional arrangement, where the back plate is formed by a rigid printed circuit board PCB, for reasons of temperature stability. The printed circuit board 83 of the invention is preferably a flexible printed circuit board arranged on the sensor side of the back plate 32. The printed circuit board 83 has an inner opening 84 to be placed around the image sensor 24 as may be seen in FIG. 8. Furthermore, the printed circuit board 83 is preferably smaller than the back plate 32 to leave one or more blank areas 85, for example margins, of the back plate 32 where it is not covered by the PCB 83, such that the lens holder 53 can be directly attached to the back plate 32 in the region of the blank areas 85 by the glue joint 80. In the embodiment shown in FIG. 3, the blank areas 85 are formed by margins along three edges of the back plate 32, such that an overall U-shaped blank area 85 is formed. The blank areas 85 may also be formed by through-holes in the PCB 83, for example.

Figure 9:
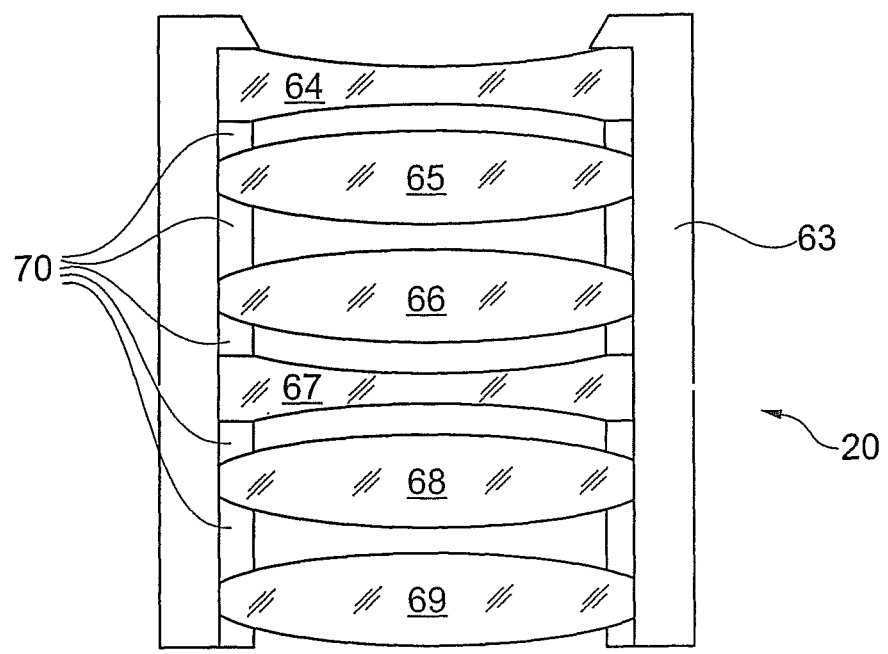
FIG. 9 shows a schematic cross-sectional view of a lens objective.

With respect to FIG. 9, the lens objective 20 comprises a lens barrel 63 and one or more lenses 64 to 69 held inside the lens barrel 63 and spaced from each other using ring shaped spacers 70. The lens barrel 63 and the spacers 70 are preferably made of metal, in particular brass. The lenses 64 to 69 may comprise positive lenses 65, 66, 68, 69 and negative lenses 64, 67.

The outer shape of the lens barrel 63 or the lens objective 20 is generally cylindrical and closely fits the inner cylindrical shape of the tubular part 54 or the lens holder 53 such that the lens objective 20 is closely guided in the lens holder 53. In particular, the gap between lens objective 20 and the lens holder 53 is small compared to the wall thickness of the tubular part 54 over the whole length of the tubular part 54.

The mounting of the camera module 12 is explained in the following with reference to FIG. 10. The camera module 12 is mounted for example by the supplier of the vision system 10. First of all the mounted back plate unit 90 (see FIG. 8) is placed for example on a holder 91 of an alignment apparatus 92. In particular, the alignment apparatus 92 may comprise a carrousel and the holder 91 may be rotatable. In a first rotation position of the holder 91 the lens holder unit 86 and the back plate unit 90 are loaded into the alignment apparatus 92. Also indexing may be performed here. Next, for example in a second rotation position of the holder 91, UV-curable glue 80 is dispended onto the blank area 85 on the sensor side of the base plate 32, or alternatively to the bottom side of the lens holder 53.

An active alignment procedure of the relative position of the lens holder unit 86 and the back plate unit 90 is then performed, for example in a third rotational position of the holder 91. A manipulator 93, which may for example engage in the position defining elements 94 (see FIGS. 3, 4, 6, 7), is controllable by a signal processing device 95, which is only schematically shown in FIG. 10, to adjust the position of the lens holder 53 or lens holder unit 86 relative to the position of the back plate 32 or back plate unit 90 along six degrees of freedom, namely in x-y-direction perpendicular to the optical z-axis for bore sight correction, tip-tilt angle $\Theta_x$, $\Theta_y$ adjustment, focus adjustment along the optical z-axis, and, with respect to stereo applications of the camera module 12, roll angle $\Theta_z$ adjustment.

Figure 10:
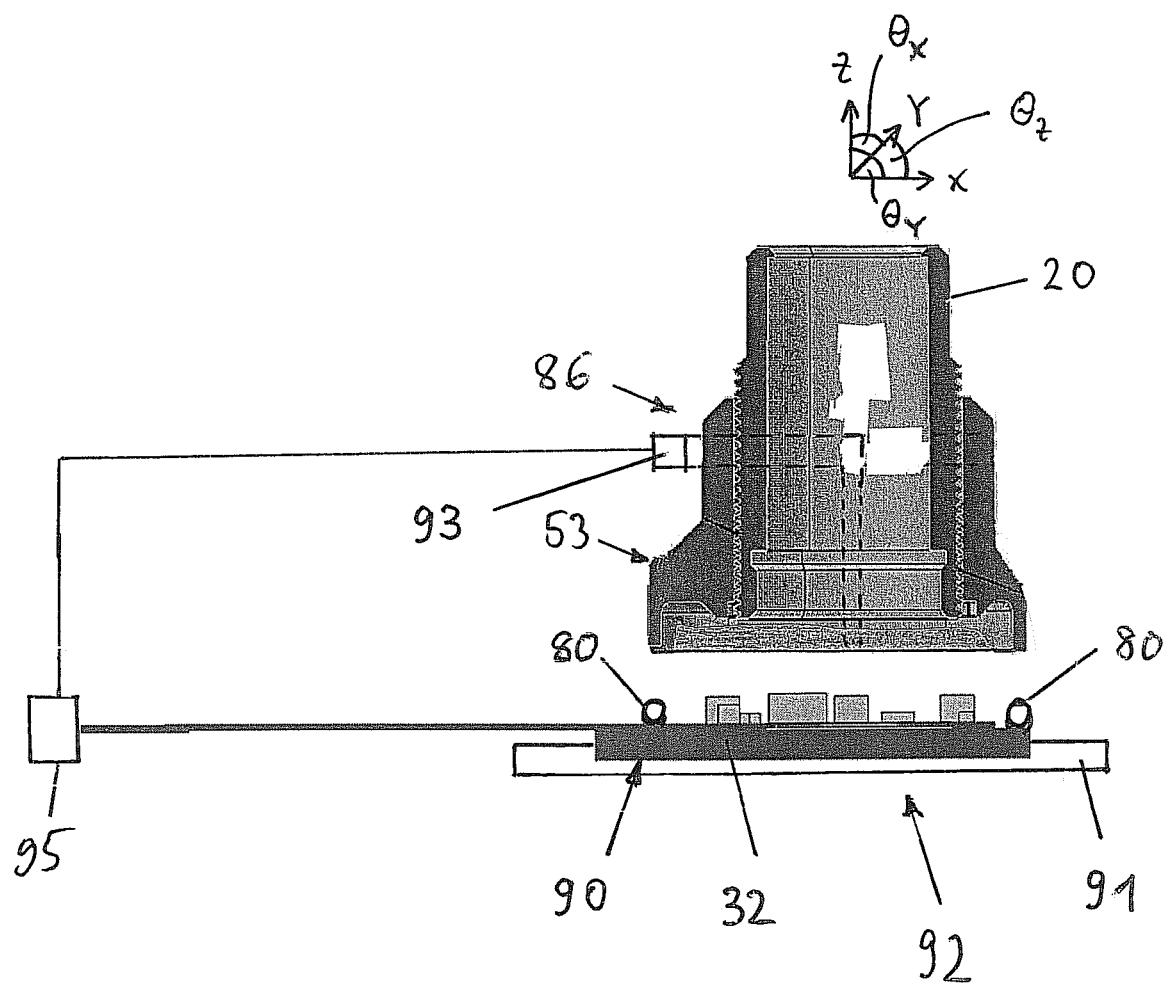
FIG. 10 illustrates a mounting procedure of the camera unit using a pre-mounted lens holder unit.

In the active alignment procedure, reference images of a reference object not shown in FIG. 10 are continuously taken by the image sensor 24 while moving the lens holder unit 86 relative to the back plate unit 90 along the optical z-axis and/or changing the tip and tilt angles $\Theta_x$, $\Theta_y$. In every relative position of the lens holder unit 86 and the back plate unit 90 the image quality is evaluated by the signal processor 95 and the evaluated image quality is used as feedback for controlling the manipulator 93 in order to adjust the lens objective 20.

The x-y position of the lens holder unit 86 relative to the back plate unit 90 is adjusted such that the bore sight error is minimal. Due to this adjustment, a generally non-zero offset between the optical z-axis and the geometrical center of the image sensor 24 is provided, such that the optical z-axis is generally not centered on the sensitive surface of the image sensor 24.

The roll angle $\Theta_z$ is adjusted such that an image taken by the image sensor 24 has a pre-determined roll alignment relative to the lens holder 53. For example, the lines and rows of the images could be aligned to be parallel to the edges of the lens holder 53 as seen in FIG. 7, without limitation to this particular alignment.

When the image quality determined by the image sensor 24 has become optimal and the x-y position and the roll angle $\Theta_z$ have been properly adjusted, the glue 80 is hardened in particular by applying UV radiation while holding the lens holder unit 86 and the back plate unit 90 in the optimal relative position. When the glue 80 is hardened, the completely mounted camera unit 20 as shown in FIG. 2 can be applied to a mono imaging means 11 as well as to a stereo imaging means 11 without any further adjustment, in particular without roll angle adjustment since the roll angle $\Theta_z$ is inherently adjusted in the camera module 12 as described above. Also the bore sight of each camera module 12 is inherently well-defined, such that no additional bore sight adjustment between two camera modules 12 is required for stereo systems. In this manner, a universally usable camera module 12 or camera eye is provided according to the present invention.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

The invention claimed is:

1. A camera module for a motor vehicle, comprising:
   a lens objective,
   a lens holder holding said lens objective, and
   a back plate connected to said lens holder and holding an image sensor in or close to an image plane of the lens objective, the back plate being formed by a rigid material,
   wherein the alignment of the lens holder relative to the back plate is fixed by a glue joint between the lens holder and the back plate,
   wherein a flexible printed circuit board is arranged on the sensor side of the back plate,
   wherein the flexible printed circuit board has an opening defining a hole that extends to the back plate, wherein the opening of flexible printed circuit board is larger than the image sensor and the image sensor is at least partially located within the opening, and
   wherein the back plate has a first side and a second side, wherein the first side is directly adjacent to portions of each of the lens holder, the image sensor and the printed circuit board.

2. The camera module as claimed in claim 1, wherein the glue joint is placed in or close to the sensitive plane of the image sensor.

3. The camera module as claimed in claim 1, wherein the glue joint is placed in or close to the image plane of the lens objective.

4. The camera module as claimed in claim 1, wherein an attachment between the lens objective and the lens holder is placed in or near the principal plane of the lens objective.

5. The camera module as claimed in claim 1, wherein the center of the back plate has a non-zero offset relative to the optical z-axis of the lens objective.

6. The camera module as claimed in claim 1, wherein the back plate is made of metal.

7. The camera module as claimed in claim 1, wherein the lens objective comprises a lens barrel and/or lens spacers made of metal.

8. The camera module as claimed in claim 7, wherein the metal is brass.

9. The camera module as claimed in claim 1, wherein the lens holder is made of metal.

* * * * *